(12) United States Patent
Dilling

(10) Patent No.: US 7,404,769 B2
(45) Date of Patent: Jul. 29, 2008

(54) SPIRAL DRIVE FASTENER WITH ENGAGEMENT RAMP

(75) Inventor: Gary Dilling, Gardner, MA (US)

(73) Assignee: Phillips Screw Company, Wakefield, MA (US)

( * ) Notice: Subject to any disclaimer, the term of this patent is extended or adjusted under 35 U.S.C. 154(b) by 0 days.

(21) Appl. No.: 11/750,725

(22) Filed: May 18, 2007

(65) Prior Publication Data

US 2007/0214920 A1   Sep. 20, 2007

Related U.S. Application Data

(62) Division of application No. 10/960,401, filed on Oct. 7, 2004, now Pat. No. 7,255,522.

(51) Int. Cl.
*B21H 3/02* (2006.01)

(52) U.S. Cl. .............. 470/63; 72/476; 470/8; 470/205

(58) Field of Classification Search ............ 72/267, 72/476; 470/8, 9, 11, 12, 17, 63, 205; 76/107.1; 81/436, 460
See application file for complete search history.

(56) References Cited

U.S. PATENT DOCUMENTS

| | | |
|---|---|---|
| 24,878 A | 7/1859 | Kearsing et al. |
| 2,248,695 A | 7/1941 | Bradshaw |
| 2,474,994 A | 7/1949 | Tomalis |
| 2,777,353 A | 1/1957 | Willis |
| 3,166,769 A * | 1/1965 | Wieber .................. 470/29 |
| 3,170,364 A * | 2/1965 | Johnson et al. ............ 411/404 |
| 3,237,506 A | 3/1966 | Muenchinger |
| 3,253,625 A | 5/1966 | Oestereicher |
| 3,324,491 A * | 6/1967 | Gutshall ................ 470/11 |
| 3,620,106 A | 11/1971 | Dixon |
| 3,763,725 A | 10/1973 | Reiland |
| 3,898,706 A * | 8/1975 | Rivalland et al. ............ 470/9 |
| 4,187,892 A | 2/1980 | Simmons |
| 4,355,552 A | 10/1982 | Gutshall |
| 5,120,173 A | 6/1992 | Grady |
| 5,171,117 A | 12/1992 | Seidi |
| 5,279,190 A * | 1/1994 | Goss et al. .............. 81/460 |
| 5,765,980 A | 6/1998 | Sudo et al. |
| 5,957,645 A | 9/1999 | Stacy |
| 6,234,914 B1 | 5/2001 | Stacy |
| 6,575,061 B2 | 6/2003 | Wagner |
| 6,626,067 B1 | 9/2003 | Iwinski et al. |
| 6,698,315 B1 | 3/2004 | Wright |
| 6,698,316 B1 | 3/2004 | Wright |
| 6,890,139 B2 * | 5/2005 | Hughes .................. 411/403 |

* cited by examiner

*Primary Examiner*—Edward Tolan
(74) *Attorney, Agent, or Firm*—Perman & Green, LLP

(57) ABSTRACT

The fastener of this application is designed to facilitate the insertion of rotating power driven tools into the fastener recess. The recess of this fastener generally uses spirally configured driving surfaces and is formed in a counterbore in the upper surface of the fastener. The driving lobes have upper surfaces that are depressed a distance into the counterbore. A ramp surface is formed on each of the upper surfaces that causes a spinning bit to fall into the recess in an engaged manner. The ramp surfaces are constructed with both removal and installation ramp portions.

11 Claims, 5 Drawing Sheets

SPIRAL DRIVE FASTENER WITH ENGAGEMENT RAMP

CROSS REFERENCE TO RELATED APPLICATION

This application claims the benefit of, and is a divisional of U.S. application Ser. No. 10/960,401 filed Oct. 7, 2004 now U.S. Pat. No. 7,255,522 which is incorporated by reference herein in its entirety.

BACKGROUND OF THE INVENTION

1. Field of the Invention

This application relates in general to drive systems for threaded fasteners, tools for their manufacture, and drivers for applying torque to such fasteners. More specifically this application relates to fasteners that employ winged type drivers. In particular fasteners having a recess that provides spiral driving surfaces and further wherein said recess is designed to facilitate engagement of a rotating driver.

2. Brief Description of Related Developments

Threaded fasteners commonly used in industrial applications typically are driven by power tools at high speeds and under high torque loads. Such conditions present difficult design considerations, particularly with respect to the drive systems and, more particularly, with threaded fasteners having a driver engageable recess in the fastener head. Ideally, such a drive system should be easily manufactured, both as to recess and head geometry as well as to associated tooling for forming the fastener head and drivers for engaging the recess. The strength of the head of the fastener should not be adversely affected by the recess. The driver should be easily insertable into and easily withdrawn from the recess. The driver and recess, when mated, should distribute the stress loads uniformly to avoid formation of highly localized regions of stress that might result in deformation of the recess, or driver, or both, leading to premature failure of the drive system.

The drive system should resist cam-out of the driver from the recess when the fastener is driven. In many applications, it is very important that the fastener must be capable of withstanding several cycles, as in applications where the fasteners must be removed in order to repair or replace parts or to remove and replace access panels. The fastener drive system ideally should be capable of such repeated cycling, particularly in environments where the recess may become contaminated, painted, corroded or otherwise adversely affected in use. In such environments, it is essential that the drive system maintain driving engagement while applying torque in a removal direction. It may be necessary for the drive system to be capable of applying even higher levels of torque when removing the fastener, as may occur when the fastener is over-torqued during initial assembly, or where corrosion develops at the interface, at the engaged threads, or if thermal cycling of the assembled components has placed increased stress on the fastener. Where one or more of these, and other, characteristics may present competing considerations, compromises of one in favor of another may be made.

A variety of recess and driver configurations are in common use, including a number of cross-recesses, such as those described in U.S. Pat. No. 24,878 (Smith et al.); U.S. Pat. No. 3,237,506 (Muenchinger) and U.S. Pat. No. 2,474,994 (Tomalis). Other fastener geometries include multi-lobe geometries of the type described in U.S. Pat. No. 3,763,725 (Reiland) and ribbed drive systems as described in U.S. Pat. No. 4,187,892 (Simmons). Also among the common recess configurations is the Allen system which is essentially a straight walled hexagonally shaped socket receptive to a similarly shaped driver.

With the exception of the ribbed systems, the walls and faces of the driver and recess typically are designed to fit closely with each other in an effort to achieve face-to-face contact of the driving and driven surfaces. With cross-recess fasteners, such face-to-face engagement can occur only, if at all, when the driver is properly aligned and seated within the recess. As a practical matter, however, in order to enable the driver to be inserted into the recess, there necessarily must be some clearance between the two.

The necessity for such clearance is even more critical with recesses having substantially vertical drive walls, as in the Reiland '725 patent and Allen head systems. In all of these systems, the practical result of the necessity for such clearance is that substantial face-to-face, broad area contact between the driver and recess surfaces is seldom achieved, if at all. With most drive systems for threaded fasteners, the driver mates with the recess in the head in a manner that results in point or line contact rather than face-to-face broad area contact. The actual area of contact typically is substantially less than full face-to-face contact. Consequently, when torque is applied by the driver, the forces applied to the screw head tend to be concentrated in localized areas with resulting high localized stresses. Such localized high stress can plastically deform the recess, forming ramps or other deformations resulting in premature, unintended disengagement of the driver from the recess.

The foregoing difficulties have been recognized in the art. For example, U.S. Pat. No. 2,248,695 (Bradshaw) discloses a screw head and driver arrangement in which the driving and driven faces of the driver and fastener, respectively, are curved and located eccentrically with respect to the screw axis. In the Bradshaw fastener, any "suitable curvature" such as circular or log spiral may be used as long as it is oriented to bind or lock together by frictional engagement. Notwithstanding Bradshaw's teachings, later fastener drive systems, as those referred to above, do not appear to have adopted the Bradshaw teaching of relying on frictional engagement.

A drive system for maximizing the engageable surface area between the driver and recess is described in U.S. Pat. No. 5,957,645, which is commonly owned with the subject application. The disclosure of the '645 patent is incorporated in this application by reference. The recess and driver of the '645 patent are constructed with spirally configured engaging surfaces.

The advantages of the invention described in the '645 patent are achieved by configuring the driving and driven surfaces of the driver and fastener, respectively, to conform to a segment of a spiral and, particularly, in a spiral configuration that enables a substantial and generous clearance between the driver and the recess during insertion and removal of the driver but in which the fully seated driver is permitted to rotate to take up that clearance. The spiral configurations of the drive walls of the driver and the driver-engageable walls of the recess are such that when the spiral walls engage, they do so over a relatively broad area thereby applying and distributing the stress over that broad area. The spirally configured driving and driven walls are oriented to direct a major portion of the applied torque substantially normal to the fastener radius with little, if any, reliance on frictional, near-tangential engagement.

While each of the multiple lobed drive systems have some similarities and differences, it is common among them that, as the engagement of the recess and driver is optimized, the insertion of the driver becomes more problematic. Relatively precise alignment between the driver and lobes is required in order to obtain quick, full engagement. This is especially critical in production and other environments where the driver is generally rotating as it is being engaged with the recess of a fastener. In the rotating mode and even in simple manual installations, the failure of proper alignment of the driver in the recess may generate deformation of the fastener head and even destruction of the fastener. There are several solutions to this problem in the prior art.

U.S. Pat. Nos. 277,353, 3,253,625, and 3,620,106 describe a variety early insertion enhancing recess configurations that apply to specific driver designs. More recently U.S. Pat. No. 5,171,117 issued to Seidl in 1992 and describes a guide surface 27 for adaptation to a multilobular recess. The guide surface of this system extends over the upper surface of a lobe and gradually slopes downward in the direction of installation of the fastener. This configuration is difficult to manufacture and only facilitates installation. It is counter productive in engaging drivers in the removal direction of the fastener.

It is a purpose of this invention, to construct a surface on the lobe of a recess that is easily manufactured and provides ramps in both directions of fastener rotation.

SUMMARY OF THE INVENTION

The fastener of this application is designed to facilitate the insertion of rotating power driven tools into the fastener recess. The recess of this fastener generally uses spirally configured driving surfaces and is constructed having radially inward protruding lobes that define the wings of the recess. Lobes are formed in a counterbore in the upper surface of the fastener and each has an upper surface that is depressed a distance into the counterbore. A ramp surface is formed in the upper surfaces that causes a spinning bit to fall into the recess in an engaged manner. The ramp surface is constructed with both removal and installation ramp portions. The removal ramp portion extends from an apex to a trailing edge in a sector of predetermined circumference. Removal ramp portion is formed to decline at a compound angle generally downward, radially inward towards the axis of the fastener and generally downward in the removal direction. An installation ramp portion extends from the apex of the ramp surface to its leading edge in a sector of another predetermined circumference. The installation ramp portion is formed to decline at a compound angle generally downward radially inward towards the axis of the fastener and generally downward in the installation direction.

In this manner a fastener recess is provided that may be manufactured using familiar techniques and that facilitates engagement in both the installation and removal directions.

BRIEF DESCRIPTION OF THE DRAWINGS

The fastener of this invention is explained in more detail below with reference to the accompanying drawing, in which.

DETAILED DESCRIPTION OF THE PREFERRED EMBODIMENT(S)

Figure 1:
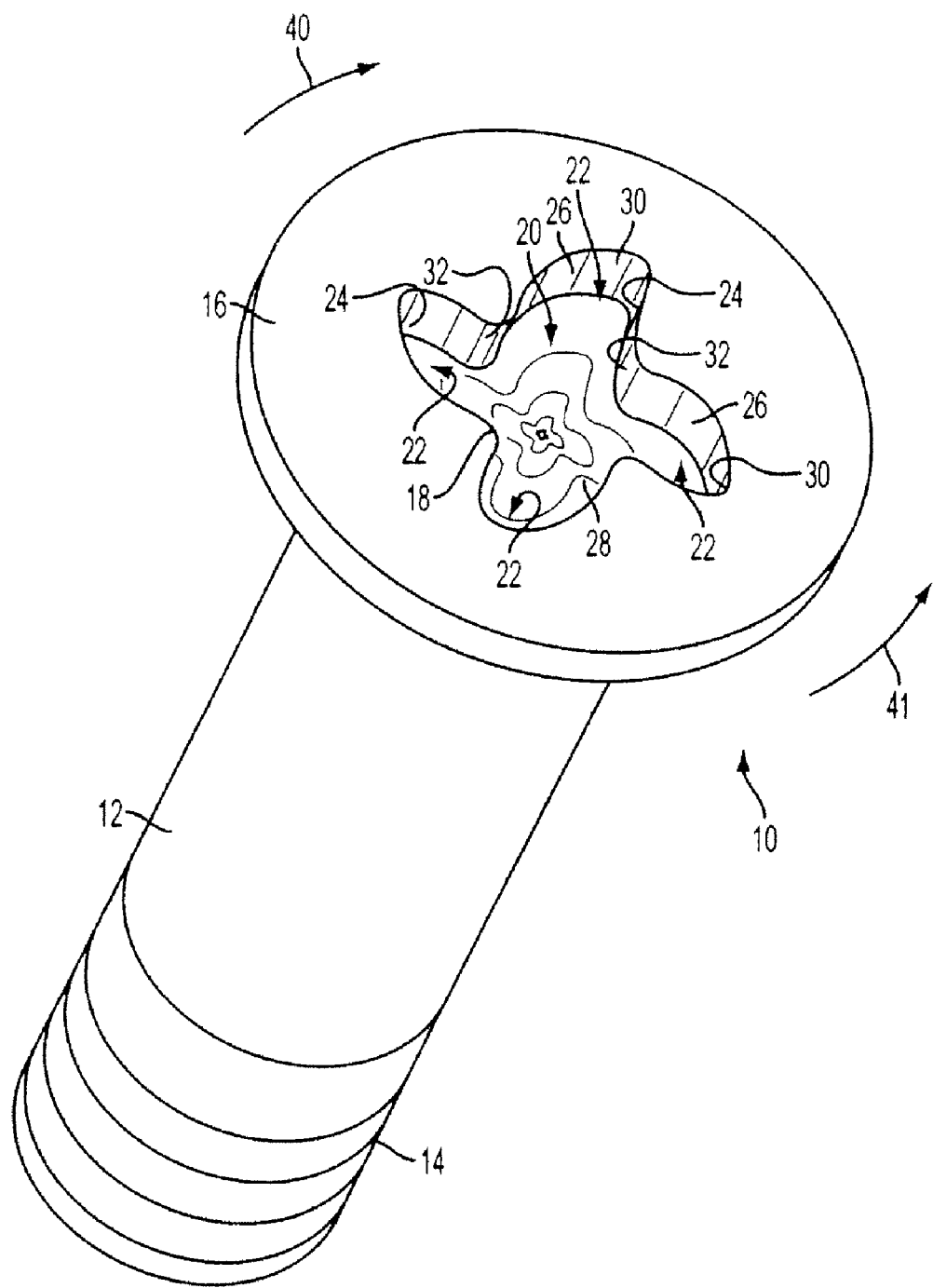
FIG. 1 is perspective view of a flat head screw having a spirally configured recess.

FIG. 1 illustrates an exemplary threaded fastener 10 having a shank 12 with threads 14 formed at one end and a head 16 with a recess 18 formed at the other end. The head 16 may be formed in a conventional two-blow header machine in which the end of the wire or other material from which the fastener is made is supported in a die of the header machine and its head end is impacted, first with a punch that partially forms the head, and then with a finishing punch that finishes the head and forms the driver-engageable recess.

The recess 18 is illustrated as having a central portion 20 and a plurality of radially outwardly extending wings 22. The recess in the embodiment of FIG. 1 is formed so that each of its wings 22 has an installation wall 24 (assuming a right-handed thread 14) and a removal wall 26. The installation wall 24 and removal wall 26 preferably are formed to be substantially vertical, defining or closely approximating a cylindrical surface parallel to the longitudinal axis of the screw. The bottom of the recess may be defined by a conical bottom wall 28. The radially outer end of each wing may be contoured to provide a smoothly curved transition 30 between the installation wall 24 and removal wall 26 of the wing. The recess also includes an inner transition wall 32 between the installation wall 24 of one wing 22 and the removal wall 26 of the next adjacent wing 22.

It should be understood that the invention may be incorporated in threaded fasteners in a wide variety of configurations including recesses generally of the cruciform type and those having more or less than four wings as shown. Although the subject invention is described with reference to a spiral type engagement, this invention may be equally effective in recesses having other engagement schemes.

Figure 2:
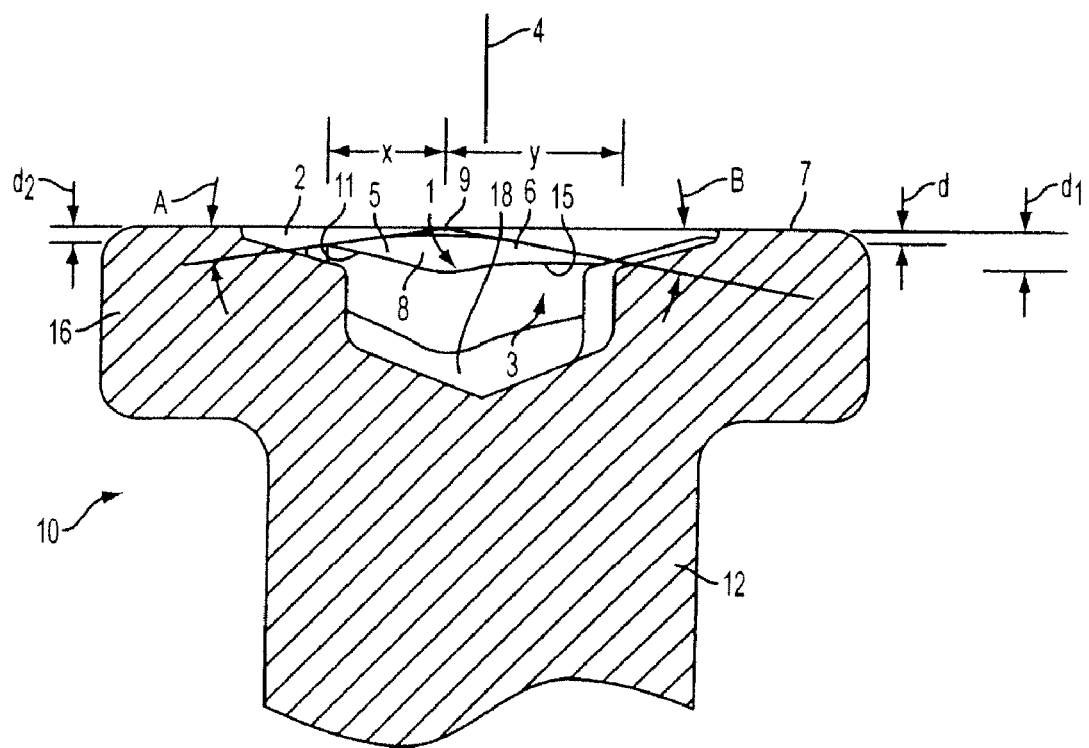
FIG. 2 is a cross sectional view of a flat head screw having a ramped lobe surface according to this invention.

The fastener of this invention is generally similar to that shown in FIG. 1, but includes the modifications shown in FIG. 2. As stated above the fastener 10 of this application is designed to facilitate the insertion of rotating power driven tools into the recess 18. The recess 18 of the fastener 10 of this invention is best shown in the sectional view of the attached FIG. 2 and in the perspective view of FIG. 3. Fastener 10 comprises head 16 and shank 12. Head 16 is constructed with a recess 18 formed in upper surface 7 of the head 16. Recess 18 is constructed, for example, having four radially inward protruding lobes 3 that define the wings 22 of the recess.

In the fastener of this invention lobes 3 are formed in a counterbore 2 in upper surface 7 and have an upper surface 8 that is depressed a distance d into the counterbore 2.

Figure 3:
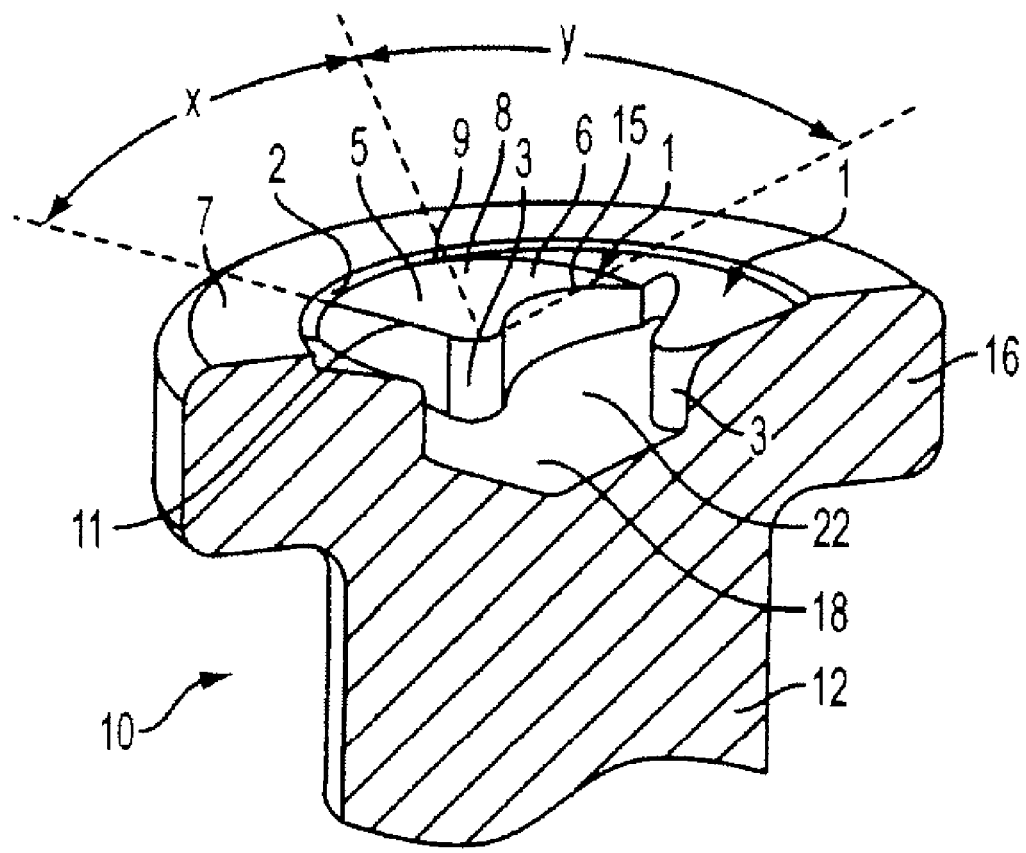
FIG. 3 is a perspective sectional view of a fastener having the engagement ramp of this invention.

Each ramp surface 1 is similarly formed in the recessed upper surface 8 of the lobes 3, as shown in FIGS. 2 and 3, and is constructed with an ramp 1 that extends over a sector of approximately 90°. The ramp 1 and the counterbore 2 cause a spinning bit to fall into the recess in an engaged manner. The ramp 1 of lobe surface 8 is constructed with both removal and installation ramp portions 5 and 6 respectively.

Removal ramp portion 5 extends from the apex 9 of ramp 1 to trailing edge 11 (using a clockwise rotation 40 of FIG. 1 as a reference) to form a sector of circumference x. Removal ramp portion 5 is formed to decline at a compound angle generally downward, radially inward towards the axis of the fastener and generally downward in the removal direction (counterclockwise direction 41 in FIG. 1) at an angle A, as shown in FIG. 2. Angle A will be in the range of 1° to 2°.

Installation ramp portion 6 extends from the apex 9 of ramp 1 to leading edge 15 (using a clockwise rotation 40 of FIG. 1 as a reference) to form a sector of circumference y. Installation ramp portion 6 is formed to decline at a compound angle also generally downward, radially inward towards the axis of the fastener and generally downward in the installation direction (clockwise direction 40) at an angle B, as shown in FIG. 2. Angle B will be in the range of 2° to 6°.

In the embodiment of FIG. 2, ramp portion 6 extends for a sector of substantially 60° and ramp 5 extends for a sector of substantially 30°. This will change according to the number of lobes, but in general the relative size of the ramp portions will be roughly 2 to 1 for ease of manufacture.

Counterbore 2 assists in the engagement of the driver by accelerating the engagement of the driver as it approaches the ramp 1. Counter bore 2 is constructed at a minimum depth d, at the apex 9 of ramp 1, which will vary depending on the size of the fastener, for example, 0.0044 inches for a fastener having a recess size MT-1. The ramp portion 6 declines at angle B from the apex 9 in the installation direction to a depth $d_1$. The ramp portion 5 declines at angle A in the removal direction to a depth $d_2$.

Figure 4:
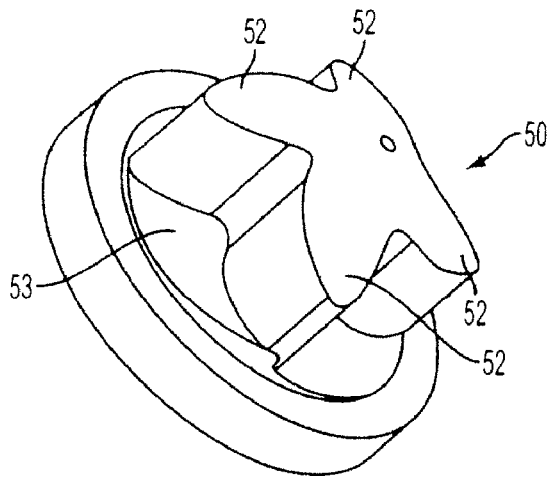
FIG. 4 is a perspective view of a punch for use in making the recess of FIG. 2.
Figure 5:
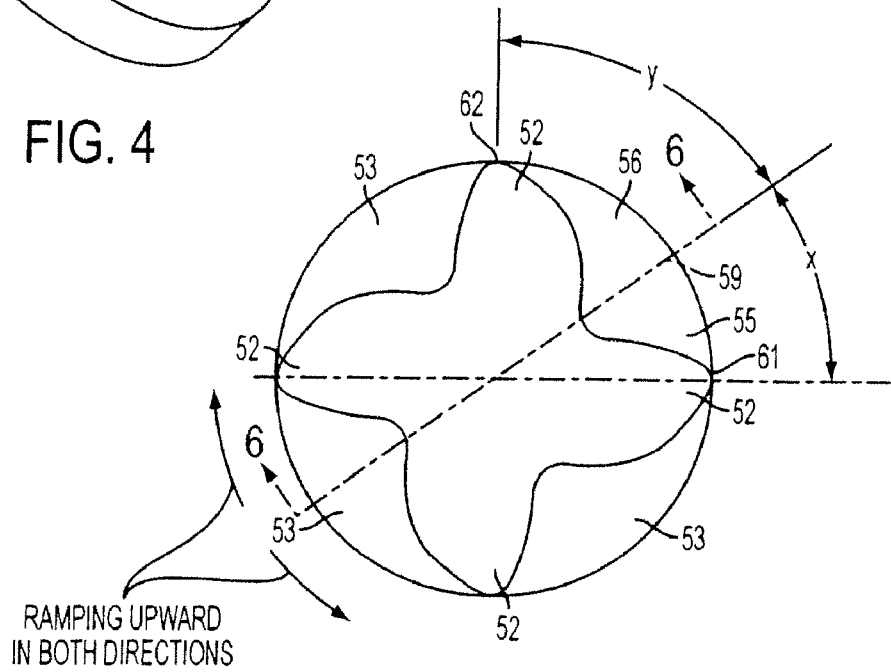
FIG. 5 is a top view of the punch of FIG. 4.
Figure 6:
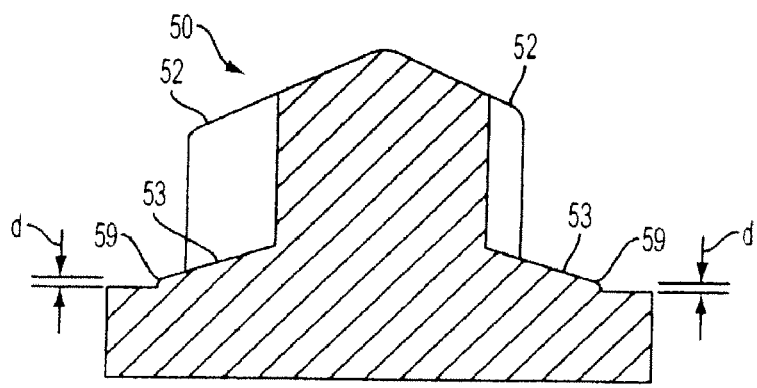
FIG. 6 is a side sectional view of the punch of FIG. 4 taken along the sections lines 8-8 of FIG. 5.

A punch 50 is shown in FIGS. 4-6 and is constructed for use in cold forming the recess of this invention into a fastener blank by pressing under high pressure in a well known manner. Punch 50 is formed with lobes 52 for forming the wings 22 of the fastener 10 shown in FIGS. 2 and 3. Lobes 52 extend outward from surfaces 53 that are constructed to form the counter bore 2 of fastener 10. Surfaces 53 are contoured as a mirror image of the ramp portions 5 and 6 to form the ramp 1 of fastener 10.

To accomplish this, surfaces 53 are constructed with portion 55 extending from the apex 59 of surface 53 to tip 61 of the adjacent lobe 52, in the clockwise direction in FIG. 5, to form a sector of circumference x. Portion 55 is formed to incline at a compound angle generally upward, radially inward towards the axis of the punch and generally upward towards tip 61 at angle A, as shown in FIG. 2. Angle A will be in the range of 1° to 2°.

In addition a portion 56 extends from the apex 59 of surface 53 to tip 62 of the adjacent lobe in the counterclockwise direction of FIG. 5 to form a sector of circumference y. Portion 56 is formed to incline at a compound angle generally upward radially inward towards the axis of the punch and generally upward towards tip 62 at an angle B, as shown in FIG. 2. Angle B will be in the range of 2° to 6°. In the embodiment of FIG. 5, portion 56 extends for a sector of substantially 60° and portion 55 extends for a sector of substantially 30°. This will change according to the number of lobes, but in general the relative size of the ramp portions will be roughly 2 to 1 for ease of manufacture.

Figure 7C:
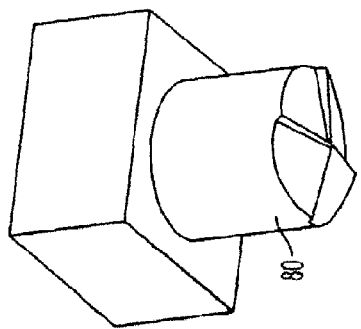
FIGS. 7a-7e illustrate the steps in the construction of a punch for use in forming the recess of this invention.
Figure 8A:
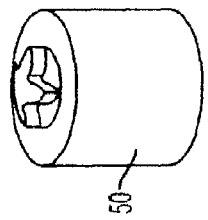
FIGS. 8a-8b illustrate the cold forming of the recess of this invention utilizing the punch of FIG. 7.
Figure 8B:
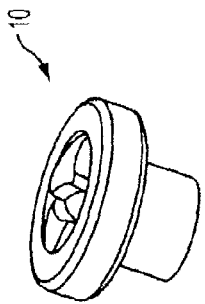

Punch 50 is constructed, as shown in FIGS. 7a-7e, and is then used to cold form the fastener 10 in a well known manner as shown in FIGS. 8a and 8b.

Figure 7B:
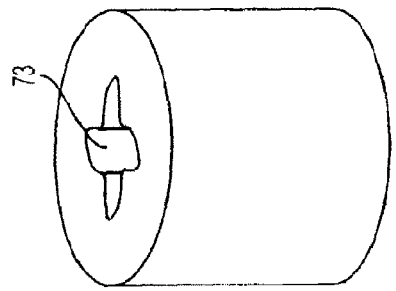
Figure 7E:
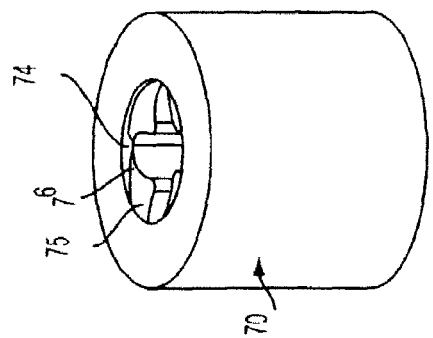
Figure 7A:
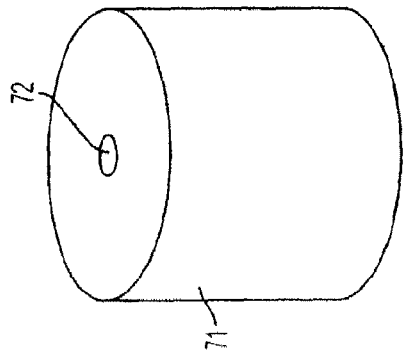

To construct punch 50, a wire EDM operation is used to construct a die or hob 70, as shown in FIGS. 7a-7e, for cold forming a punch from which the recess of fastener 10 can be made. The hob 70 is constructed from a blank 71 of steel bar stock, for example, one inch long by one inch in diameter, that is centerless ground to a tolerance of one inch +0.0005/−0.0000. The ends of the blank need to be parallel and square to the outside diameter. Close tolerances are necessary to ensure a successful wire EDM operation. As shown in FIG. 7a, a central bore 72 is drilled axially in the blank 71 at a diameter less than the root diameter of recess 18.

The fully dimensioned and drilled blank 71 is then positioned in a wire EDM fixture with the wire inserted through the bore 72. The wire EDM is programmed to cut out a block of material to form a die cavity 73 in the shape of the spiral recess 18, as shown in FIG. 2. To achieve the portions 55 and 56 on each lobe in punch 50, an EDM probe 80 is machined with the contours of surfaces 53, as shown in FIG. 7c. Surfaces 81,82,83 and 84 are machined onto probe 80. In order to obtain the required shape for the ramp surfaces, the surfaces 81-84 are machined at compound angles of 9 and 15 degrees.

Figure 7D:
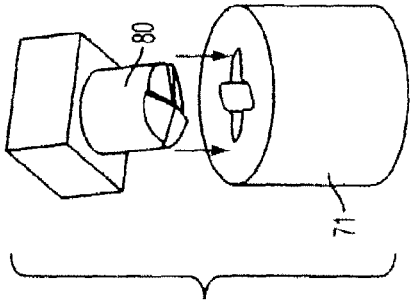

Using probe 80, as shown in FIG. 7d, a counterbore 74 having ramp surfaces 75 and 76 on each lobe can be formed. Die cavity 73 of hob 70 is then complete with the shape of the recess 18 of fastener 10, as shown in FIG. 7e. Hob 70 is then used to make punch 50 by pressing. Fastener 10 can be made by cold forming a blank using the punch 50 as shown in FIGS. 8a and 8b.

While the invention has been described with reference to specific embodiments, the description of the specific embodiments is illustrative only and is not to be construed as limiting the scope of the invention. Various other modifications and changes may occur to those skilled in the art without departing from the spirit and scope of the invention, as defined by the claims.

The invention claimed is:

1. A method of making a punch for forming a recess in the top surface of the head of a fastener, said recess having multiple radially inward extending lobes that define spirally configured driving surfaces, said driving surfaces extending substantially axially, from outward facing top surfaces of the lobes towards the bottom of the recess, said driving surfaces constructed for engagement with a mating drive tool for rotating said fastener in installation and removal directions about a longitudinal axis, said method comprising the steps of:

forming a substantially cylindrical, axially aligned, bore in a die blank, forming multiple lobes in said bore to define the multiple driving surfaces of the fastener recess;

constructing a non-driving ramp surface on each of said multiple lobes of said die on outward facing surfaces thereof, said ramp surfaces being recessed a predetermined depth in a counterbore in said bore, each of said ramp surfaces further comprising:

an installation ramp portion extending radially inward and circumferentially in the installation direction from an apex of said ramp surface, wherein said installation ramp portion declines from the apex at a compound angle both radially and circumferentially; and a removal ramp portion extending radially inward and circumferentially in the removal direction from the apex of said ramp surface, wherein said removal ramp portion declines from the apex at a compound angle both radially and circumferentially;

wherein said installation ramp portion and said removal ramp portion are adapted to urge a rotating drive tool into mating engagement with the drive surfaces in either the installation or removal directions; and cold forming the punch by pressing a punch blank into said die.

2. The method according to claim 1, wherein the step of constructing a ramp surface on each of said multiple lobes on outward facing surfaces thereof further comprises the steps of:

constructing a substantially cylindrical wire EDM probe shaped to fit within the counterbore, said probe having an engaging surface;

constructing a series of forming surfaces matching the number of lobes on said engaging surface to form the compound angles of the installation and removal ramp portions.

3. The method according to claim 2, wherein the step of constructing a series of forming surfaces further comprises the step of machining four forming surfaces at a compound angle of 9 and 15 degrees.

4. A punch for forming a recess in the top surface of the head of a fastener, said recess having multiple radially inward extending lobes that define spirally configured driving surfaces, said driving surfaces extending substantially axially, from outward facing top surfaces of the lobes towards the bottom of the recess, said driving surfaces constructed for engagement with a mating drive tool for rotating said fastener in installation and removal directions about a longitudinal axis, said punch comprising:

a punch head extending outward from a shank to a tip having lobes arranged to form the spirally configured driving surfaces, said punch head having a first diameter at the shank and further comprising;

a substantially cylindrical, axially aligned, base portion having a second diameter, said base portion constructed outward on the shank of the punch wherein, said second diameter is less than said first diameter, and further wherein said lobes project outward from said base portion to the tip and extend in the radial direction to the second diameter, said lobes forming wing shaped surfaces facing outward on said base portion, between each lobe;

a non-driving ramp surface constructed on each of said wing shaped surfaces, each of said ramp surfaces further comprising:

an installation ramp portion extending radially inward and circumferentially in the installation direction from a trough of said ramp surface, wherein said installation ramp portion inclines from the trough at a compound angle both radially and circumferentially; and a removal ramp portion extending radially inward and circumferentially in the removal direction from a trough of said ramp surface, wherein said removal ramp portion inclines from the trough at a compound angle both radially and circumferentially.

5. A punch, according to claim 4, wherein said installation ramp portion forms a sector of said base extending in a first predetermined circumference and said removal ramp portion forms a sector of said base extending in a second predetermined circumference and wherein said first sector circumferences is greater than said second sector circumference.

6. A punch, according to claim 5, wherein the ratio of said first sector circumferences to said second sector circumference is substantially 2 to 1.

7. A punch, according to claim 5, wherein said first sector circumference is 60° and said second sector circumference is 30°.

8. A punch, according to claim 4, wherein the installation ramp portion inclines circumferentially at a predetermined angle.

9. A punch, according to claim 8, wherein said predetermined angle is in the range of 2° to 6°.

10. A punch, according to claim 4, wherein the removal ramp portion inclines circumferentially at a predetermined angle.

11. A recess for a fastener, according to claim 10, wherein said predetermined angle is in the range of 1° to 2°.

* * * * *